United States Patent
Shaffer

(10) Patent No.: US 7,976,222 B2
(45) Date of Patent: Jul. 12, 2011

(54) DRIVETRAIN CONNECTION HAVING FILM BEARINGS

(75) Inventor: Bradley J. Shaffer, Romney, IN (US)

(73) Assignee: Caterpillar Inc., Peoria, IL (US)

( * ) Notice: Subject to any disclaimer, the term of this patent is extended or adjusted under 35 U.S.C. 154(b) by 930 days.

(21) Appl. No.: 11/882,321

(22) Filed: Jul. 31, 2007

(65) Prior Publication Data

US 2009/0034890 A1    Feb. 5, 2009

(51) Int. Cl.
*F16C 17/02*    (2006.01)

(52) U.S. Cl. ........................................ 384/114; 384/294

(58) Field of Classification Search .................. 384/99, 384/114, 294; 74/655; 192/3.21; 475/31, 475/59

See application file for complete search history.

(56) References Cited

U.S. PATENT DOCUMENTS

| 2,354,139 | A | * | 7/1944 | Paton | 475/53 |
| 2,548,207 | A | * | 4/1951 | Dunn | 192/3.23 |
| 3,471,205 | A |   | 10/1969 | Farron et al. | |
| 4,175,803 | A |   | 11/1979 | Roberts | |
| 4,427,309 | A |   | 1/1984 | Blake | |
| 4,527,910 | A |   | 7/1985 | Fleming | |
| 4,771,864 | A |   | 9/1988 | Lorimor et al. | |
| 5,045,027 | A |   | 9/1991 | Larsen | |
| 5,071,262 | A |   | 12/1991 | Monzel et al. | |
| RE34,276 | E |   | 6/1993 | Glaser et al. | |
| 5,421,655 | A |   | 6/1995 | Ide et al. | |
| 5,425,584 | A |   | 6/1995 | Ide | |
| 6,210,103 | B1 |   | 4/2001 | Ramsay | |

FOREIGN PATENT DOCUMENTS

JP    5-44722    *    2/1993

* cited by examiner

*Primary Examiner* — William C Joyce

(74) *Attorney, Agent, or Firm* — Finnegan, Henderson, Farabow, Garrett & Dunner LLP

(57) ABSTRACT

A drivetrain for use with a power unit. The drivetrain may have a driving member, a driven member, and a sleeve disposed between the driving member and the driven member. The drivetrain may further have a first oil film bearing disposed between the sleeve and one of the driving member and the driven member.

19 Claims, 2 Drawing Sheets

DRIVETRAIN CONNECTION HAVING FILM BEARINGS

TECHNICAL FIELD

The present disclosure is directed to a drivetrain and, more particularly, to a drivetrain connection having oil film bearings.

BACKGROUND

Machines, including on and off-highway haul and vocational trucks, wheel loaders, motor graders, and other types of heavy equipment generally include a multi-speed, bidirectional, mechanical transmission drivingly coupled to an engine by way of a hydraulic torque converter. The hydraulic torque converter multiplies and/or absorbs torque fluctuations transmitted from the engine to the transmission by allowing slippage between a crankshaft of the engine and an input shaft of the transmission. The hydraulic torque converter is rotationally connected to and driven by the crankshaft via a splined interface at an outer periphery, and held in alignment with the crankshaft at a center of rotation by a support member.

During operation of the machine, vibrational disturbances may be transmitted from the engine to the torque converter and, in reverse direction, from the torque converter to the engine. This vibration, depending on its frequency and amplitude, can be damaging to the drivetrain components. Thus, it may be desirable to limit transmission of the vibrational disturbance and/or protect against damage caused by the disturbance.

One way to protect against excessive wear of a drivetrain connection caused by vibration is described in U.S. Pat. No. 5,045,027 (the '027 patent) issued to Larsen on Sep. 3, 1991. Specifically, the '027 patent discloses a drivetrain connection between a crankshaft-driven flywheel and a torque converter input shaft. The flywheel includes a central bore that receives a rear nose portion of the torque converter input shaft to center the shaft within the flywheel. An optional wear sleeve can be disposed within the flywheel to stabilizingly support the rear nose portion of the input shaft. In this manner, the torque converter is both centered relative to the flywheel and somewhat protected from relative vibrations between the flywheel and input shaft.

Although the drivetrain connection of the '027 patent may help minimize damage caused by relative vibrations between the flywheel and the torque converter, the benefit provided by the wear sleeve may be minimal. That is, the '027 patent only concentrates on wear caused by the vibration and does little to dampen the vibrations. Without dampening the vibrations, the drivetrain connection may still suffer from unacceptable component life.

The drivetrain connection of the present disclosure solves one or more of the problems set forth above.

SUMMARY OF THE INVENTION

One aspect of the present disclosure is directed to a drivetrain. The drivetrain may include a driving member, a driven member, and a sleeve disposed between the driving member and the driven member. The drivetrain may further include a first oil film bearing disposed between the sleeve and one of the driving member and the driven member.

DETAILED DESCRIPTION

Figure 1:
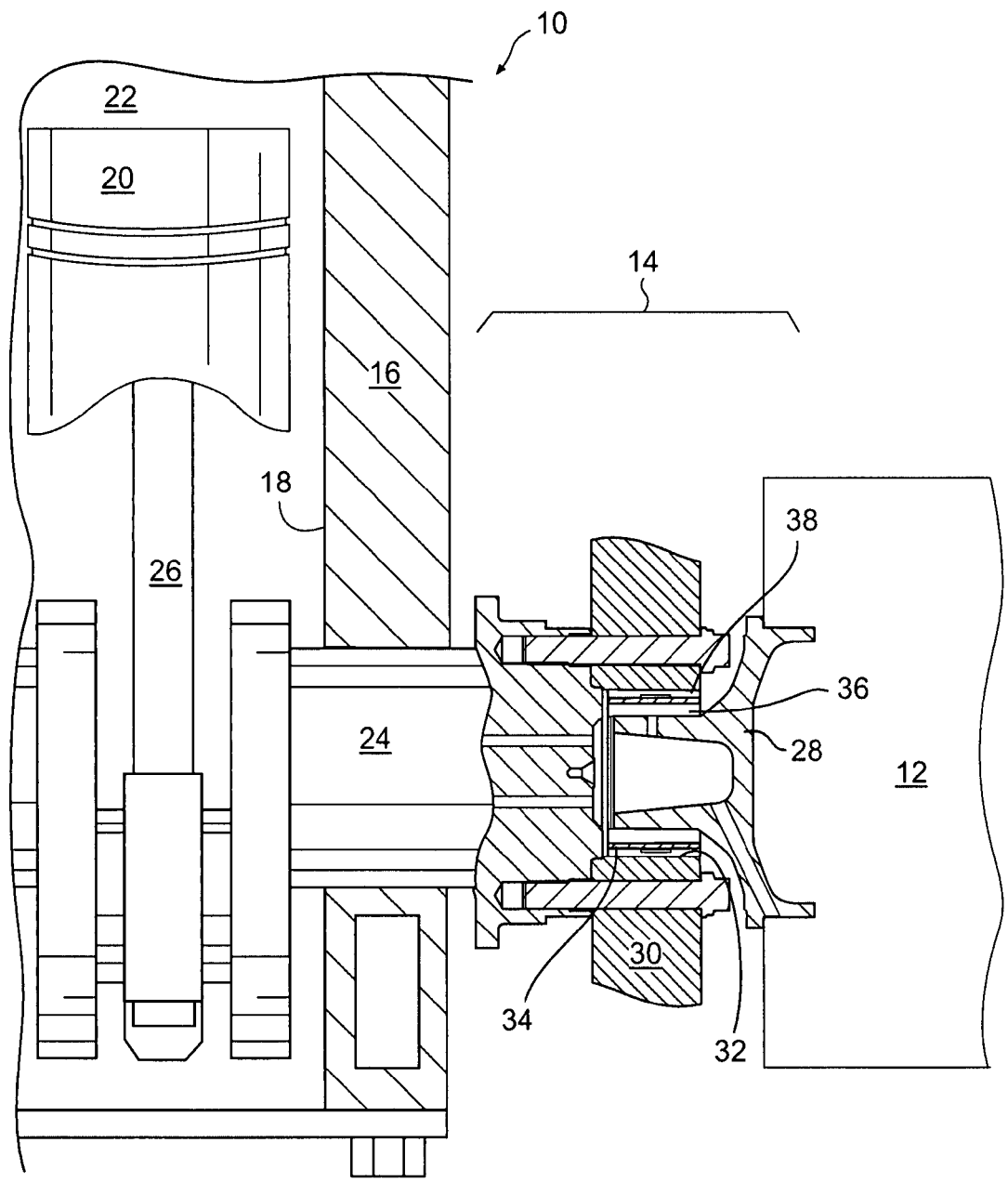
FIG. 1 is a cross-sectional illustration of an exemplary disclosed drivetrain.

FIG. 1 illustrates a power unit 10 coupled to a driven element 12 by way of a drivetrain connection 14. For the purposes of this disclosure, power unit 10 is depicted and described as a four-stroke diesel engine. One skilled in the art will recognize, however, that power unit 10 may be any other type of combustion engine such as, for example, a gasoline or a gaseous fuel-powered engine; or non-combustion engine such as a fuel cell, a motor, or other power unit known in the art.

In the embodiment of FIG. 1, power unit 10 may include multiple components that cooperate to combust a fuel/air mixture and produce a power output. In particular, power unit 10 may include an engine block 16 that at least partially defines one or more cylinders 18 (only one shown), a piston 20 slidably disposed within each cylinder 18, and a cylinder head (not shown) associated with each cylinder 18. Cylinder 18, piston 20, and the cylinder head may form a combustion chamber 22. It is contemplated that power unit 10 may include any number of combustion chambers 22 and that combustion chambers 22 may be disposed in an "in-line" configuration, a "V" configuration, or in any other suitable configuration.

Power unit 10 may also include a crankshaft 24 that is rotatably disposed within engine block 16. A connecting rod 26 may connect each piston 20 to crankshaft 24 so that a sliding motion of piston 20 within each respective cylinder 18 results in a rotation of crankshaft 24. Similarly, a rotation of crankshaft 24 may result in a sliding motion of piston 20.

In the disclosed embodiment, driven element 12 may include a torque converter driven by the motion of crankshaft 24. However, it is contemplated that driven element 12 may be another component driven by the operation of power unit 10 such as, for example, the input shaft of a transmission unit, an electric power generator, or a pump, if desired. Driven element 12 may include an input member 28 such as the housing or shaft of the torque converter. In this embodiment, an impeller (not shown), may be connected to the housing or shaft, and driven by crankshaft 24 to generate a flow of hydraulic fluid. The flow of hydraulic fluid may then be received by another, opposing impeller (not shown) to drive an output shaft (not shown) of driven element 12. In this manner, the output shaft may be driven somewhat independently of input member 28. The amount of independent rotation between input member 28 and the output shaft of driven element 12 may be varied by modifying a pressure and/or a flow rate of the oil directed between the impellers.

Input member 28 may be also be known as a torque converter nose. Input member 28 may be radially supported by a crankshaft adapter 30, which, in some embodiments, may be an integral part of a flywheel that stabilizes the rotational speed of the power unit 10, provides torque driving connection to driven element 12, facilitates speed sensing, and includes starting gear teeth. Crankshaft adapter 30 may include a central bore 32 configured to receive an end of input member 28. Crankshaft adapter 30 may be aligned with and fixedly connected to an end of crankshaft 24.

A sleeve 34 may be slidingly engaged with central bore 32 of crankshaft adapter 30, and radial spaces may be maintained between input member 28 and sleeve 34, and between sleeve 34 and crankshaft adapter 30 (i.e., between an outer annular surface of sleeve 34 and an internal annular wall of central bore 32). These radial spaces may allow for fluid media such as a lubricating oil to flow and some misalignment to exist between crankshaft 24 and input member 28. In addition, the oil flow may be pressurized to form first and second oil film bearings 36, 38 within the radial spaces such that sleeve 34 is floated between input member 28 and crankshaft adapter 30. For the purposes of this disclosure, an oil film bearing may be defined as a layer or "film" of lubricant located between two solid components, wherein the lubricant supports one or both of the components and maintains physical separation between the components so as to minimize physical contact therebetween. First oil film bearing 36 may be located radially inward of sleeve 34, while second oil film bearing 38 may be located radially outward of sleeve 34. Sleeve 34 may be retained within central bore 32 by the geometry of input member 28 that flares radially outward at an open end of central bore 32. It is contemplated that sleeve 34 may alternatively or additionally be axially retained within central bore 32 by one or more snap rings, dowels, or other types of retaining means known in the art.

Figure 2:
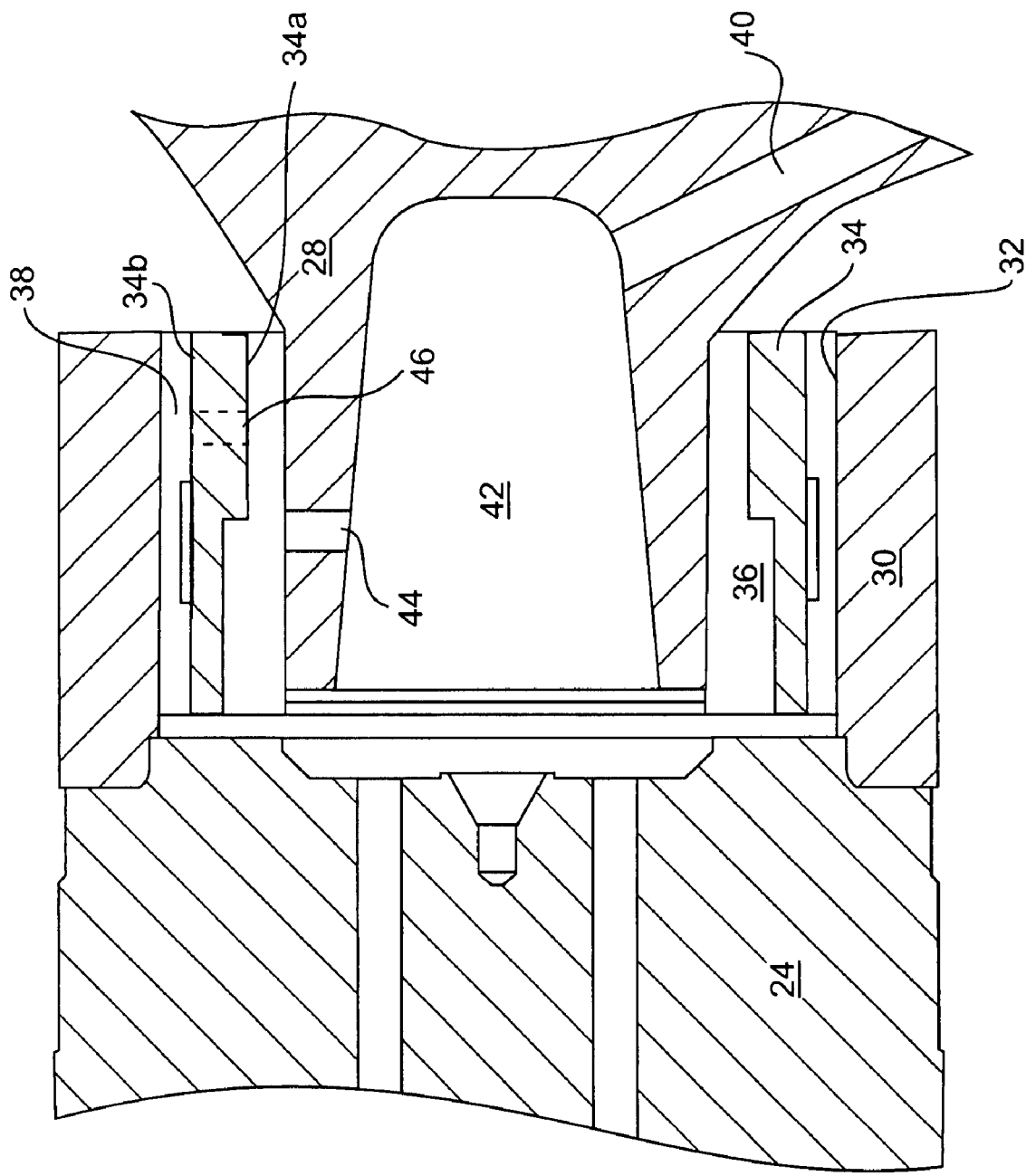
FIG. 2 is an enlarged cross-sectional illustration of an exemplary connection in the drivetrain of FIG. 1.

As illustrated in FIG. 2, first and second oil film bearings 36, 38 may be provided with pressurized oil from driven element 12. Specifically, oil at a pressure of about 400 kPa may pass from driven element 12 through a passageway 40 into a central cavity 42 of input member 28. From central cavity 42, the pressurized oil may be directed radially outward to first oil film bearing 36 via a passageway 44. From first oil film bearing 36, the pressurized oil may flow around opposing ends of sleeve 34 to second oil film bearing 38. In this configuration, the pressure of first and second oil film bearings 36, 38 may be substantially identical. It is contemplated, however, that a restricted passageway 46 within sleeve 34 may, instead, allow pressurized oil to pass from first oil film bearing 36 directly through sleeve 34 to second oil film bearing 38. If restricted passageway 46 is included within sleeve 34, oil may be inhibited from flowing around the ends of sleeve 34 by way of, for example, 0-rings (not shown) located on an outer periphery at the ends of sleeve 34. In this alternative configuration, the restriction of passageway 46 may be modified to provide two substantially different pressures for first and second oil film bearings 36, 38. It is also contemplated that the flow of pressurized oil may alternatively or additionally be supplied axially from crankshaft 24 and/or radially from crankshaft adapter 30, if desired.

The ability of first and second oil film bearings 36 or 38 to support input member 28 without collapse of the bearings (i.e., without metal-to-metal contact of the components supported by the bearings) may depend on the pressure of the oil within and the egress rate of oil from the associated radial spaces. That is, if it is relatively difficult for the oil to be forced from the associated radial space and/or the pressure of the oil is high, high stiffness of drivetrain connection 14 may be provided. In contrast, if it is relatively easy for the oil to be forced from the radial space and/or the pressure of the oil is low, drivetrain connection 14 may be generally soft. A stiffer connection may improve alignment between driven element 12 and crankshaft 24, while a softer connection may improve vibration dampening. A combination of a stiff oil film bearing and a soft oil film bearing may allow tailoring of drivetrain connection 14 to meet the requirements of a particular application.

Sleeve 34 may be provided with geometry at an internal or an external surface 34a, b that inhibits the egress of oil from first and second oil film bearings 36, 38. This geometry may include, for example, a labyrinth of grooves (i.e., recesses and/or protrusions) formed in one or both of internal and external surfaces 34a, b. In some embodiments, the flow-inhibiting geometry may be different on internal surface 34a, as compared to external surface 34b (i.e., internal surface 34a may inhibit the flow of oil to a different degree, as compared to external surface 34b). By locating the flow-inhibiting geometry in sleeve 34 rather than in the walls of central bore 32 or in the outer surface of input member 28, the stiffness and dampening characteristics of drivetrain connection 14 can easily be altered by simply exchanging one sleeve 34 for another sleeve 34 having different flow-inhibiting geometry.

The basic size and shape of each sleeve 34 may be also adjusted to provide varying degrees of stiffness and vibration dampening. Specifically, a length, a thickness, a bearing surface axial location, and/or a material property of sleeve 34 may be adjusted to provide a softer oil film bearing that dampens out vibrations or a stiffer oil film bearing that keeps driven element 12 more aligned with crankshaft 24. For example, internal surface 34a is shown in FIG. 2 as having a shorter length than that of external surface 34b. In general, a shorter bearing surface (i.e., lesser bearing area) may provide greater dampening for the same pressure of oil, while a longer surface (i.e., greater bearing area) may provide for greater stiffness. In one example, the length of internal and/or external surfaces 34a and 34b may vary within the range of about 5-35 mm.

FIG. 2 also shows sleeve 34 having diameters chosen to provide a relatively thin outer film bearing 38 and a relatively thick inner film bearing 36. In general, a thinner oil film bearing may provide for enhanced stiffness, while a thicker oil film bearing may provide for enhanced vibration dampening. In one example, the thickness of first and/or second oil film bearings 36, 38 may vary within the range of about 5-100 μm. The thickness of first and second oil film bearings 36,38 may be adjusted by modifying an inner and/or outer diameter of sleeve 34 relative to the outer diameter of input member 28 and/or the inner diameter of central bore 32.

Further, internal surface 34a is shown as being axially misaligned (i.e., offset to the right in FIG. 2) relative to external surface 34b. This misalignment may have an effect on the stiffness of drivetrain connection 14 at a particular location within central bore 32. Other adjustments to the geometry of sleeve 34 may be similarly made to vary the characteristics of first and second oil film bearings 36, 38.

A material property of crankshaft 24 and input member 28 may affect parameters of oil film bearings 36 and 38 selected for a particular application. Specifically, crankshaft 24 is generally fabricated from a softer material such as gray iron, as compared to input member 28, which is commonly fabricated from a cast steel that is often hardened. In general, a harder material can accommodate higher loads without excessive wear, as compared to a softer material. As such, in some applications, the length of inner oil film bearing 38 may be shorter (i.e., the bearing area may be less) and the pressure higher than the length and pressure of outer oil film bearing 38 (referring to FIG. 1). The area of an oil film bearing may be varied for a given diameter by varying its length.

Similarly, an expected level of vibrational disturbance may affect the parameters selected for first and second oil film bearings 36 and 38. For example, when a relatively higher frequency disturbance is expected, a thickness of the oil film bearings may be greater than a for a lower frequency disturbance.

INDUSTRIAL APPLICABILITY

The drivetrain connection of the present disclosure may be applicable to any power unit/driven element configuration where the transmission of vibrations between the power unit and driven unit is undesired. The disclosed drivetrain connection may minimize vibrational loading and improve the component life of an associated connection interface with the use of a floating sleeve and multiple oil film bearings. Operation of the disclosed drivetrain connection will now be explained.

As a fuel/air mixture is combusted by power unit 10, the reciprocating motion of pistons 20 may be translated to a rotation of crankshaft 24. This rotational motion may then be transmitted to crankshaft adapter 30, and from crankshaft adapter 30 to driven element 12 by way of input member 28.

During motion of power unit 10 such as during the operation of a mobile machine that utilizes power unit 10 as a prime mover, vibrational loading may be induced within power unit 10. If transmitted in its entirety to driven element 12, the induced vibrational loading may damage components of driven element 12. Drivetrain connection 14 may minimize the amount of vibrational loading transmitted between power unit 10 and driven element 12 by allowing some movement between crankshaft 24 and input member 28 and by absorbing and/or dampening some of the loading with first and second oil film bearings 36, 38. For example, as crankshaft 24 is radially translated relative to input member 28, the films of pressurized oil on either side of sleeve 34 (i.e., the lubricant layers of first and second oil film bearings 36 and 38) may be squeezed and the oil forced from the corresponding radial spaces. The time required for the radial spaces to collapse (i.e., the time required for the oil to escape from the radial spaces and metal to metal contact to occur) cushions and, thereby, dampens the vibrational disturbance.

In order to prevent excessive wear at the connection between power unit 10 and driven element 12, relative misalignment between crankshaft 24 and input member 28 must also be limited. The stiffness of first and/or second oil film bearings 36, 38 may provide this stiffness, without cancelling the dampening effects described above.

Because drive connection 14 may include multiple oil film bearings, vibrational disturbance of either power source 10 or driven element 12 may be effectively dampened without adversely affecting alignment between the two components. And, because the parameters of each oil film bearing may be independently adjusted, the dampening and stiffness characteristics of drivetrain connection 14 may be precisely tailored over a wide range to meet the needs of particular applications.

It will be apparent to those skilled in the art that various modifications and variations can be made to the drivetrain of the present disclosure without departing from the scope of the disclosure. Other embodiments will be apparent to those skilled in the art from consideration of the specification and practice of the drivetrain disclosed herein. For example, although only two oil film bearings are illustrated and described, any number of oil film bearings may be provided within drivetrain connection 14. And, the oil film bearings, together with sleeve 34, may be collected into a self-contained sub-assembly or kit that may later be placed into position between crankshaft 24 and input member 28. It is intended that the specification and examples be considered as exemplary only, with a true scope of the disclosure being indicated by the following claims and their equivalents.

What is claimed is:

1. A drivetrain, comprising:
    a driving member;
    a driven member;
    a sleeve disposed between the driving member and the driven member;
    a first oil film bearing disposed between the sleeve and one of the driving member and the driven member;
    a second oil film bearing disposed between the sleeve and the other of the driving member and the driven member;
    wherein at least one portion of the sleeve has a reduced radial thickness such that a first bearing surface of the sleeve exposed to the first oil film bearing has a length substantially different from a length of a second bearing surface of the sleeve exposed to the second oil film bearing;
    wherein the driving member and the driven member are made from substantially different materials; and
    wherein the one of the first and second bearing surfaces located to mate with the one of the driving member and the driven member made from a harder material has a length shorter than the other of the first and second bearing surfaces.

2. The drivetrain of claim 1, wherein the first bearing surface is axially misaligned relative to the second bearing surface.

3. The drivetrain of claim 1, wherein a thickness of the first oil film bearing is substantially different from a thickness of the second oil film bearing.

4. The drivetrain of claim 1, wherein a first bearing surface of the sleeve exposed to the first oil film bearing has a surface condition substantially different from a surface condition of a second bearing surface of the sleeve exposed to the second oil film bearing.

5. The drivetrain of claim 1, wherein the sleeve includes at least one orifice fluidly connecting the first and second oil film bearings, and the orifice is restricted to provide a desired pressure difference between the first and second oil film bearings.

6. The drivetrain of claim 1, wherein the first oil film bearing has a length in the range of about 5-35 mm.

7. The drivetrain of claim 6, wherein the first oil film bearing has a thickness in the range of about 5-100 μm.

8. A drivetrain, comprising:
    a driving member;
    a driven member;
    a sleeve disposed between the driving member and the driven member, the sleeve having a different radial thickness at its axially opposite ends;
    a first oil film bearing disposed between the sleeve and one of the driving member and the driven member; and
    a second oil film bearing disposed between the sleeve and the other of the driving member and the driven member, wherein the second oil film bearing is stiffer than the first oil film bearing.

9. The drivetrain of claim 8, wherein:
    the driving member and the driven member are made from substantially different materials; and
    the second oil film bearing is located to mate with the one of the driving member and the driven member made from a softer material.

10. The drivetrain of claim 8, wherein the first oil film bearing is supplied with oil from the driven member.

11. The drivetrain of claim 10, wherein a pressure of the oil is about 400 kPa.

12. The drivetrain of claim 8, wherein one of the driving member, the driven member, and the sleeve includes geometry configured to inhibit egress of oil from the first oil film bearing.

13. The drivetrain of claim 8, wherein the sleeve is supported by the first and second oil film bearings to float between the driven member and the driven member.

14. The drivetrain of claim 8, wherein the sleeve is axially retained within a recess of one of the driving member and the driven member by the other of the driven member and the driven member.

15. The drivetrain of claim 8, wherein a pressure of the first oil film bearing is substantially different from a pressure of the second oil film bearing.

16. The drivetrain of claim 15, wherein the one of the first and second oil film bearings located radially outermost has a pressure greater than the other of the first and second oil film bearings.

17. The drivetrain of claim 8, wherein a viscosity of the first oil film bearing is substantially different than a viscosity of the second oil film bearing.

18. The drivetrain of claim 8, wherein a first bearing surface of the sleeve exposed to the first oil film bearing has a length substantially different from a length of a second bearing surface of the sleeve exposed to the second oil film bearing.

19. The drivetrain of claim 18, wherein the one of the first and second bearing surfaces located radially outermost has a length greater than the one of the first and second bearing surfaces located radially innermost.

* * * * *